US012791575B2

(12) United States Patent
Barksdale et al.

(10) Patent No.: US 12,791,575 B2
(45) Date of Patent: Nov. 10, 2026

(54) SYSTEM AND METHOD FOR VIBRATION-BASED ROTATIONAL SPEED MEASUREMENT

(71) Applicant: Cornell Pump Company LLC, Clackamas, OR (US)

(72) Inventors: Joshua Barksdale, Sandy, OR (US); Aaron Arthur Weiss, Portland, OR (US)

(73) Assignee: Cornell Pump Company LLC, Clackamas, OR (US)

( * ) Notice: Subject to any disclaimer, the term of this patent is extended or adjusted under 35 U.S.C. 154(b) by 544 days.

(21) Appl. No.: 18/449,799

(22) Filed: Aug. 15, 2023

(65) Prior Publication Data

US 2024/0069056 A1 Feb. 29, 2024

Related U.S. Application Data

(60) Provisional application No. 63/373,238, filed on Aug. 23, 2022.

(51) Int. Cl.
*G01P 3/44* (2006.01)
*G01P 1/07* (2006.01)

(52) U.S. Cl.
CPC . *G01P 3/44* (2013.01); *G01P 1/07* (2013.01)

(58) Field of Classification Search
CPC ........................................................ G01P 3/44
(Continued)

(56) References Cited

U.S. PATENT DOCUMENTS 5,744,723 A 4/1998 Piety
6,087,796 A 7/2000 Canada et al.
(Continued)

FOREIGN PATENT DOCUMENTS

DE 269683 A1 12/1987

OTHER PUBLICATIONS

International Search Report and Written Opinion issued in corresponding PCT Application No. PCT/US2023/072185, mailed Nov. 30, 2023, 12 pages.
(Continued)

*Primary Examiner* — Walter L Lindsay, Jr.
*Assistant Examiner* — Philip T Fadul
(74) *Attorney, Agent, or Firm* — Fish & Richardson P.C.

(57) ABSTRACT

A device, system, and method are provided for providing vibration-based rotational speed measurements for rotating machinery. A sensor device is provided as a one-piece unit that is mechanically mounted to a pump. The sensor device includes a vibration sensor, a wireless communications interface for exchanging data with a user device, an internal battery, and a processor. The processor receives a measurement request from the user device, retrieves data samples from the vibration sensor, generates an acceleration spectrum based on the data samples, and detects peaks in the acceleration spectrum. The processor then selects, from the detected peaks, peaks corresponding to vibration at the rotational speed and its harmonics, calculates a rotational speed value based on a highest-frequency peak of the shaft frequency peak and its associated harmonic peaks, and sends the rotational speed value to the user device via the wireless communication interface.

17 Claims, 8 Drawing Sheets

(58) Field of Classification Search
USPC .......................................................... 73/488
See application file for complete search history.

(56) References Cited

U.S. PATENT DOCUMENTS

| | | | |
|---|---|---|---|
| 7,300,321 | B2 | 11/2007 | Phillips et al. |
| 7,971,650 | B2 | 7/2011 | Yuratich et al. |
| 8,215,931 | B2 | 7/2012 | McDowell et al. |
| 8,720,629 | B2 | 5/2014 | Sohn et al. |
| 9,273,694 | B2 | 3/2016 | Brady et al. |
| 10,031,535 | B2 | 7/2018 | Rollins et al. |
| 10,258,730 | B2 | 4/2019 | Franano et al. |
| 10,690,131 | B2 | 6/2020 | Rashid et al. |
| 10,711,802 | B2 | 7/2020 | Hambe et al. |
| 10,738,580 | B1 | 8/2020 | Fischer et al. |
| 10,794,173 | B2 | 10/2020 | Ebrahimi et al. |
| 11,014,655 | B2 | 5/2021 | Smith et al. |
| 11,053,758 | B2 | 7/2021 | Fischer et al. |
| 11,181,101 | B2 | 11/2021 | Byrne |
| 11,209,008 | B2 | 12/2021 | Nishimura |
| 11,220,896 | B2 | 1/2022 | Fischer et al. |
| 2006/0064231 | A1 | 3/2006 | Fekete et al. |
| 2008/0069364 | A1 * | 3/2008 | Itou .......................... H04R 5/04 381/17 |
| 2017/0066464 | A1 * | 3/2017 | Carter ....................... B62B 3/14 |
| 2017/0269118 | A1 | 9/2017 | Liu et al. |
| 2019/0203729 | A1 | 7/2019 | Nishimura |
| 2019/0310281 | A1 | 10/2019 | Hayzen et al. |
| 2019/0339162 | A1 | 11/2019 | Munk |
| 2020/0408079 | A1 | 12/2020 | Ebrahimi et al. |
| 2021/0388837 | A1 | 12/2021 | Nygaard et al. |
| 2021/0396238 | A1 | 12/2021 | Nishimura |
| 2021/0409845 | A1 | 12/2021 | Weiss et al. |
| 2022/0004179 | A1 * | 1/2022 | Badkoubeh .......... G05B 23/024 |

OTHER PUBLICATIONS

International Preliminary Report on Patentability in International Appln. No. PCT/US2023/072185, mailed on Mar. 6, 2025, 9 pages.

* cited by examiner

SYSTEM AND METHOD FOR VIBRATION-BASED ROTATIONAL SPEED MEASUREMENT

CROSS-REFERENCE TO RELATED APPLICATION

This application claims priority under 35 U.S.C. § 119, based on U.S. Provisional Patent Application No. 63/373,238 filed Aug. 23, 2022, titled "System and Method for Vibration-Based Rotational Speed Measurement," the disclosure of which is hereby incorporated by reference.

BACKGROUND OF THE INVENTION

Monitoring devices, such as tachometers, may be used to determine a rotational speed of a pump shaft. A typical way to measure a pump's revolutions per minute (RPM) is to directly observe the shaft rotational speed using a magnetic or optical sensor mounted near the shaft. This method is reliable and accurate. However, mounting a sensor near the shaft and routing its cable to an external processing unit is often impractical.

DETAILED DESCRIPTION OF EMBODIMENTS

The following detailed description refers to the accompanying drawings. The same reference numbers in different drawings may identify the same or similar elements. Also, the following detailed description does not limit the invention.

Systems and methods described herein provide a rotational speed detection system for rotating machinery, such as a centrifugal pump. A wireless, battery-powered sensor device may be mounted to a pump's bearing frame or casing and may report the pump's shaft rotational speed in revolutions-per-minute (RPM) to a user device. According to an implementation, the sensor device obtains accelerometer data and performs unique measurement calculations locally on a low-cost multi-purpose processor. The measurement calculations minimize processor cycles and power requirements to provide vibration-based rotational speed measurements. The rotational speed measurements can be wirelessly transmitted to a paired user device for presentation to a user.

The systems and methods described herein allow for low cost generation of rotational speed measurements and transmission of these measurements to "the cloud." The sensor device may be equipped with a battery that provides up to a five-year battery life, for example, under intended usage. In one implementation, the sensor device may use a wireless personal area network (WPAN) communication interface to transmit data to a client application on a user device. The client application interacts with the sensor device to activate a measurement process and obtain/present a rotational speed reading. According to another implementation, the client application may provide a data log to a cloud-based application server.

The systems and methods described herein allow for a rotational speed sensor device to be mounted at any convenient location on a pump or similar piece of rotating machinery. In contrast, conventional tachometers for determining pump speed must be placed adjacent to the pump shaft. Because the sensor device can be mounted on various external surfaces and does not require any wired connections, the sensor device may be provided as a simple add-on or retrofit accessory for in-service machinery. The sensor device may be configured to function in a wide range of environments, including environments for submersible pumps.

Figure 1:
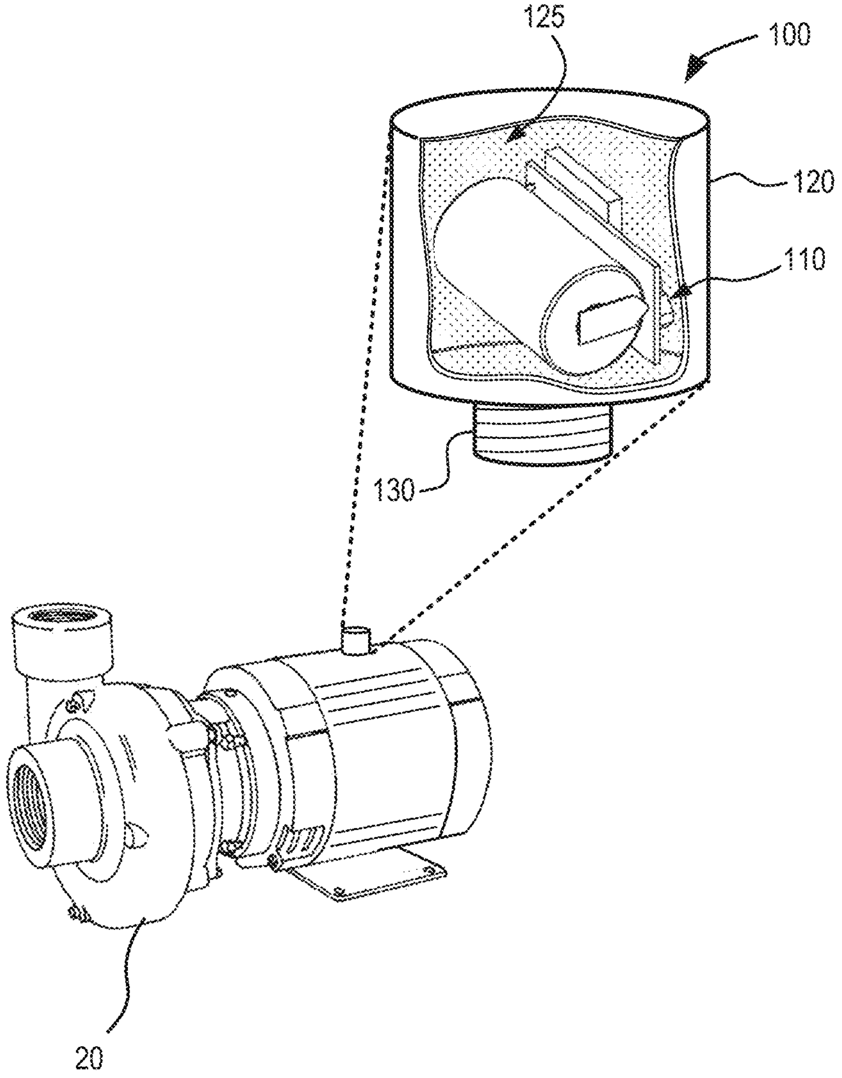
FIG. 1 is a partial cutaway view of a sensor device according to an implementation described herein and a portion of rotating machinery.

FIG. 1 is a schematic view of sensor device 100, according to an implementation described herein. Generally, sensor device 100 may be configured for attachment to a portion of rotating machinery 20, such as a pump assembly. Sensor device 100 may include an electronics assembly 110, an enclosure 120, and an attachment piece 130.

Electronics assembly 110 may include, for example, a printed circuit board (PCB) to which a battery and powered components described herein may be connected. Electronics assembly 110 may collect sample vibration data (e.g., accelerometer readings) associated with rotating machinery 20 to which sensor device 100 is attached. Electronics assembly 110 may further produce a frequency-domain representation of the acceleration readings and detect peaks at the shaft frequency to determine a pump shaft rotational speed (also referred to herein as shaft speed or rotational speed). In another implementation, electronics assembly 110 may include, or be connected to, a display (e.g., an LED or LCD display) to visibly present rotational speed readings to a user. Features of electronics assembly 110 are described further in connection with FIGS. 2-4, for example. Preferably, electronics assembly 110 and any other internal components for sensor device 100 may be relatively small to minimize the required size of enclosure 120.

Enclosure 120 may include a single piece or multiple sections joined together to form an enclosed cavity therein. Electronics assembly 110 may be secured within the cavity of enclosure 120. For example, electronics assembly 110 may be seated within the cavity and secured via a potting compound 125, such as a thermo-setting plastic or epoxy. Enclosure 120 may enable operation of electronics assembly 110 in multiple environments. In one implementation, enclosure 120 provides a sealed casing against dust or spray (e.g., sufficient for an IP65 ingress protection rating). In another implementation, enclosure 120 may provide protection against high pressure spray (e.g., sufficient for an IP66 ingress protection rating). In still other implementations, enclosure 120 may prevent ingress of water/fluid in a submerged/underwater environment (e.g., sufficient for an IP67 or IP68 ingress protection rating). Although not illustrated in FIG. 1, in another implementation, enclosure 120 may include an integrated display to present rotational speed readings to a user.

Attachment piece 130 may include an element or device for rigidly attaching enclosure 120 to rotating machinery 20. For example, as shown in FIG. 1, rotating machinery 20, such as a pump or another type of rotating equipment, may include a mounting location onto which sensor device 100 may be attached. According to one implementation, the mounting location may include a tapped mounting hole, for example. In one implementation, the mounting location may be incorporated with or located on a bearing housing of rotating machinery 20. In another implementation, sensor device 100 may configured for attachment to a submersible pump (e.g., with a watertight enclosure 120 and wired communication interface (not shown)). In still other implementations, the mounting location rotating machinery 20 may not include a dedicated mounting surface or mounting hole.

Attachment piece 130 may include a threaded bolt (e.g., as illustrated in FIG. 1), a magnet, an adhesive surface, a clamp, or another mechanism for rigidly attaching enclosure 120 to rotating machinery 20. Attachment piece 130 may be integral with enclosure 120, such that securing attachment piece 130 to rotating machinery 20 rigidly connects sensor device 100 to rotating machinery 20. In one implementation, attachment piece 130 may include a bolt configured to correspond to (e.g., engage using a thread) a tapped mounting hole in rotating machinery 20. For example, bolt 130 may be inserted into the tapped mounting hole by twisting the entire sensor device 100 assembly (e.g., by hand tightening or using an optional torque wrench). When attachment piece 130 is attached to rotating machinery (e.g., being screwed into a tapped mounting hole or otherwise attached), vibrations from rotating machinery 20 may be transmitted to electronics assembly 110.

Figure 2:
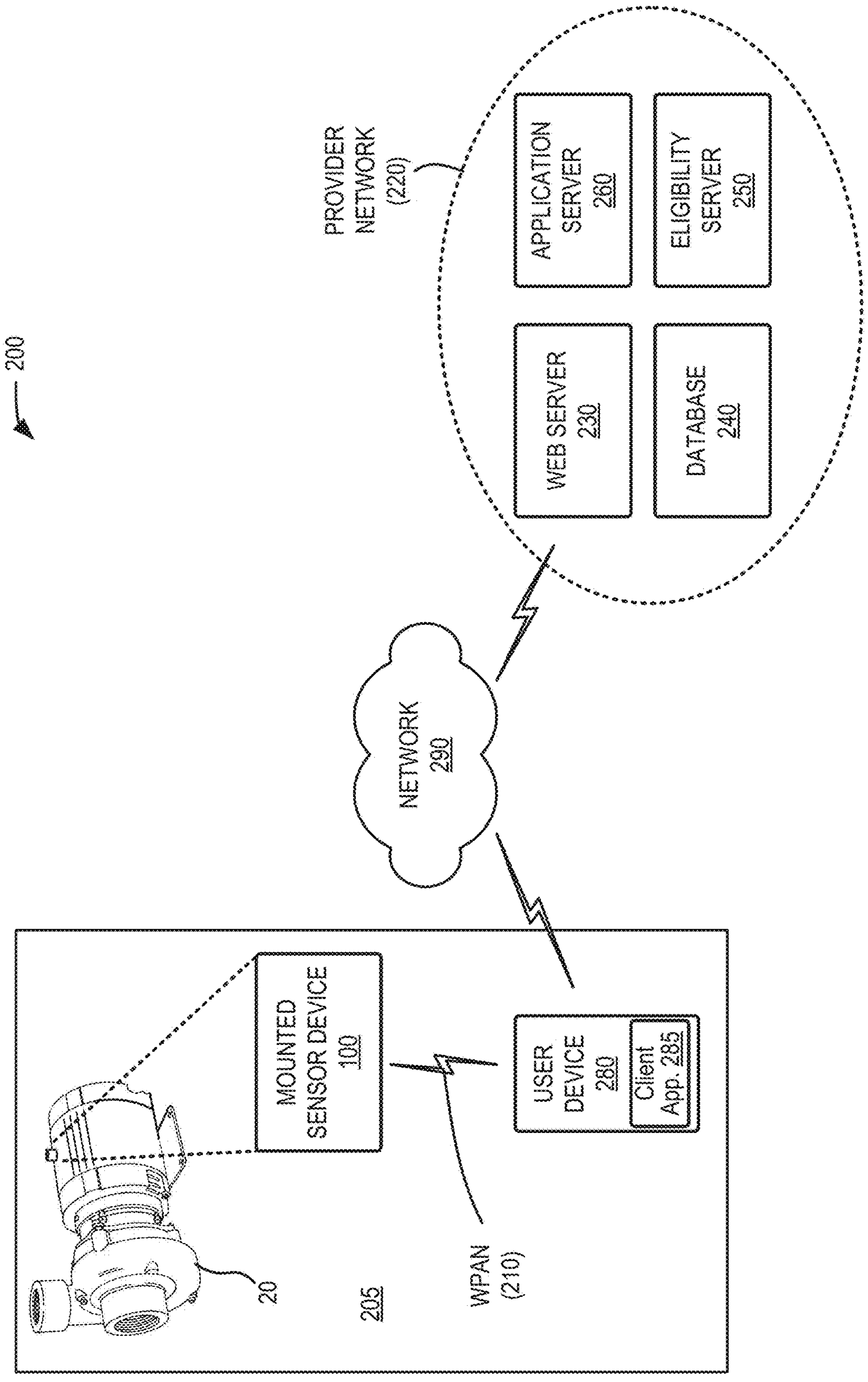
FIG. 2 is a diagram of a network environment in which systems and methods described herein may be implemented.

FIG. 2 is a diagram illustrating an exemplary environment 200 in which systems and/or methods described herein may be implemented. As illustrated, environment 200 may include rotating machinery 20 onto which one or more sensor devices 100 are mounted. According to an implementation, multiple rotating machinery 20 with mounted sensor devices 100 may be distributed throughout a customer premises 205 (e.g., in an industrial, municipal, or agricultural setting). Environment 200 may also include a provider network 220 with a web server 230, a database 240, an eligibility server 250, and an application server 260; a user device 280; and a network 290. Components of environment 200 may be connected via wired and/or wireless links.

Rotating machinery 20 may include a pump, such as a centrifugal pump or another type of pump, which may be monitored using vibration sensors. Sensor device 100 may be attached to rotating machinery 20, collect vibration (e.g., acceleration) data, calculate shaft speed (in RPMs), and provide collected data to user device 280. According to an implementation, sensor device 100 may communicate with user device 280 via a WPAN 210. WPAN 210 may use, for example, IEEE 802.15 standards (e.g., BLUETOOTH), or variations thereof, to conduct short range wireless communications.

Provider network 220 may include network devices, computing devices, and other equipment to provide services, including services for customers with sensor devices 100. For example, devices in provider network 220 may supply backend services to user devices 280 for remotely monitoring rotating machinery 20. Provider network 220 may include, for example, one or more private Internet Protocol (IP) networks that use a private IP address space. Provider network 220 may include a local area network (LAN), an intranet, a private wide area network (WAN), etc. According to an implementation, provider network 220 may use vendor-specific protocols to support Internet-of-Things (IoT) management. In another implementation, provider network 220 may include a hosting platform that provides an IoT data service. The IoT data service may include receiving packets that are transmitted by a client application 285 (e.g., running on user device 280) and implementing models to collect, store, analyze, and/or present event data from sensor devices 100, such as vibration-based rotational speed values. The hosting platform may also provide data-driven applications and/or analytics services for user devices 280, which owners of sensor devices 100 may use. Examples of hosting platforms include Amazon® Web Services (AWS), Microsoft Azure®, IBM Watson®, Verizon® ThingSpace®, etc. Although shown as a single element in FIG. 2, provider network 220 may include a number of separate networks.

Web server 230 may include one or more network or computational devices to manage service requests from eligible user devices 280. In one implementation, web server 230 may provide an application (e.g., an event data management application) to enable user device 280 to receive and respond to information related to rotating machinery 20. In another implementation, as described further herein, web server 230 may provide multiple types of browser-based user interfaces to facilitate individual pump monitoring, system monitoring, receive alerts, receive notifications, etc. Web server 230 may receive settings from user devices 280, may process/collate the received settings, and may forward the settings to application server 260 for implementation.

Database 240 may include one or more databases or other data structures to store data uploads (e.g., rotational speed readings) from sensor devices 100 via user device 280 (or received directly from sensor devices 100). Database 240 may also store reporting/monitoring configuration settings, device registrations (e.g., provided by user devices 280 via web server 230), user registrations, and/or associations of unique sensor identifiers and rotating machinery. In one implementation, database 240 may also store data retrieved from and/or used by eligibility server 250.

Eligibility server 250 may include one or more network or computational devices to provide backend support for authorizing user devices 280 to use provider network 220. For example, eligibility server 250 may store identification information for registered users and/or user devices 280. The information may be used to verify that a particular user/user device 280 has access to services and/or information provided by provider network 220. Upon verifying eligibility of a user/user device 280, eligibility server 250 may, for example, provide access to other devices in provider network 220.

Application server 260 may include one or more network or computational devices to perform services accessed through web server 230. For example, application server 260 may manage downloading applications provided to user devices 280 and/or may process incoming data (e.g., rotational speed measurements forwarded from sensor devices 100) for storage in database 240. According to an implementation, application server 260 may use a series of application programming interface (APIs) to exchange data with client application 285.

User device 280 includes a device that has computational and wireless communication capabilities. User device 280 may be implemented as a mobile device, a portable device, a stationary device, a device operated by a user, or a device not operated by a user. For example, user device 280 may be implemented as a smartphone, a computer, a tablet, a wearable device, or some other type of wireless device. In one implementation, user device 280 may include a communication interface with a cellular modem (e.g., a Long Term Evolution (LTE) or Fifth Generation network (5G) modem)

to communicate with provider network 220 and a local wireless interface (e.g., a Bluetooth® (BT)/BT Embedded System (BTE) or BT Low Energy (BLE) interface, a near-field communication (NFC) wireless interface, and/or a Wi-Fi interface) that can communicate with sensor device 100.

According to various exemplary embodiments, user device 280 may be configured to execute various types of software (e.g., applications, programs, etc.). As described further herein, user device 280 may download and/or register a client application 285. As described further herein, the client application 285 (or "app") may be configured to detect sensor devices 100 when located within relatively close proximity (e.g., a range of up to 100 feet or the physical extents of WPAN 210).

Client application 285 may initiate a local wireless connection between user device 280 and sensor device 100. In one implementation, client application 285 may include instructions to initiate the local wireless connection in response to user input to user device 280, such as user input to obtain a shaft speed measurement from sensor device 100. Client application 285 may provide a measurement request to sensor device 100 (e.g., via WPAN 210) and extract from sensor device 100 a shaft speed result (e.g., an RPM value) for the corresponding rotating machinery 20. Client application 285 may also cause user device 280 to present the current shaft speed data to a user. Using network 290, client application 285 may also forward the vibration data to provider network 220 for storage and/or analysis.

Network 290 may include one or more wired, wireless and/or optical networks that are capable of receiving and transmitting data, voice and/or video signals. For example, network 290 may include one or more access networks, IP multimedia subsystem (IMS) networks, core networks, or other networks. The access network may include one or more wireless networks and may include a number of transmission towers for receiving wireless signals and forwarding wireless signals toward the intended destinations. The access network may include a wireless communications network that connects subscribers (e.g., sensor devices 100, user devices 280, etc.) to other portions of network 290 (e.g., the core network). In one example, the access network may include an LTE and/or 5G network. In other implementations, the access network may employ another type of cellular broadband network such as a future 3rd Generation Partnership Project (3GPP) network, or another type of advanced network. Network 290 may further include one or more satellite networks, one or more packet switched networks, such as an IP-based network, a local area network (LAN), a wide area network (WAN), a wireless local area network (WLAN), an intranet, the Internet, or another type of network that is capable of transmitting data.

In FIG. 2, when in operation, a user with user device 280/application 285 may request a shaft speed measurement of rotating machinery 20 in customer premises 205. A user may bring user device 280 in proximity of sensor device 100 to initiate a request, via WPAN 210, of a current rotational speed reading for corresponding rotating machinery 20. According to an implementation, sensor device 100 may calculate a rotational speed result (e.g., based on vibration data) and provide the rotational speed result to user device 280 via WPAN 210. In another implementation, sensor 100 may also transmit a unique identifier (e.g., an alpha-numeric string) that associates sensor device 100 with rotating machinery 20. For example, a manufacturer may cross-reference a unique identifier (ID) of sensor device 100 with a unique identifier of particular rotating machinery 20 during a manufacturing or refurbishing process. The association of the sensor device ID and the rotating machinery ID may be stored, for example, in database 240.

In FIG. 2, the particular arrangement and number of components of environment 200 are illustrated for simplicity. In practice there may be more sensor devices 100, provider networks 220, user devices 280, and/or networks 290. For example, there may be multiple customer premises 205 with dozens of sensor devices 100 distributed throughout each of the customer premises 205.

Figure 3:
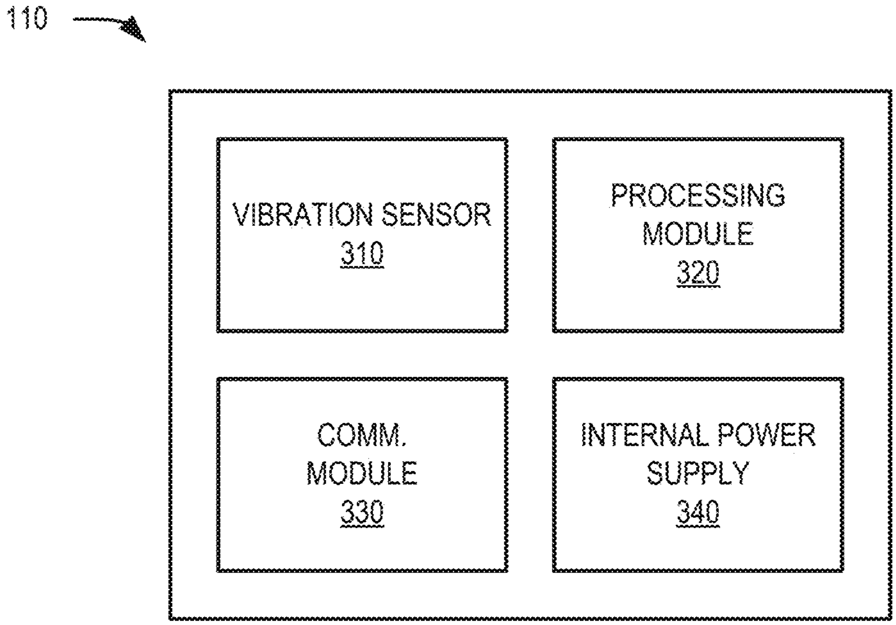
FIG. 3 is a block diagram of internal components of the electronics assembly of FIG. 1.

FIG. 3 is a block diagram of internal components of sensor device 100, which may be included, for example, in electronics assembly 110. As shown in FIG. 3, electronics assembly 110 may include a vibration sensor 310, a processing module 320, a communication module 330, and an internal power supply 340. According to different implementations, one or more components of FIG. 3 may be installed on a printed circuit board, an etched wiring board, or a printed circuit assembly. In another implementation, electronics assembly 110 may include other logical components to calculate and communicate vibration data.

Vibration sensor 310 may include an accelerometer, hardware integrators, signal amplifiers, and/or filters to detect and indicate sensed vibration of a pump (e.g., rotating machinery 20) to which sensor device 100 is attached. For example, vibration sensor 310 may include a low-power Micro-Electromechanical System (MEMS) accelerometer that can be used when in contact with the rotating machinery under test to generate raw sensor data. In one implementation, vibration sensor 310 may measure vibration along a single axis (e.g., preferably orthogonal to a rotating shaft axis of the pump). In another implementation, vibration sensor 310 may measure vibration along two axes. According to one embodiment, vibration sensor 310, in the form of a low-power MEMS accelerometer, may output a set of contiguous acceleration readings to processing module 320.

Processing module 320 may include a combination of hardware and software to perform calculations to determine rotational speed values based on acceleration data. For example, processing module 320 may include stored instructions to receive acceleration data from vibration sensor(s) 310 and calculate a pump shaft speed, as described further herein. Processing module 320 may perform calculations in a manner that minimizes processor cycles and power requirements such that rotational speed measurements may be provided using low-power 32-bit microcontroller, for example.

According to an implementation, processing module 320 may apply a Hann window function (or another apodization function) to a set of contiguous acceleration readings (e.g., received from vibration sensor 310) and then take a discrete Fourier transform (DFT) of the readings to produce a frequency-domain representation of the acceleration. Because the rotating pump shaft of rotating machinery 20 produces vibrations at the frequency of rotation, the DFT will show a relatively large amplitude or "peak" at the shaft frequency. To identify the peak, processing module 320 may make a list of all peaks in the DFT and then determines which peak in the list corresponds to the shaft frequency. Processing module 320 may then take the center frequency of a harmonic peak, divide that center frequency by the harmonic number (e.g., divide by 3, if the third harmonic peak is used), and multiply the frequency by 60 to obtain shaft RPM. An example of this calculation sequence is described further in connection with FIG. 4 below.

Still referring to FIG. 3, in other implementations, processing module 320 may include one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs), microcontrollers, and/or some other type of component that interprets and/or executes instructions and/or data. Processing module 320 may be implemented as hardware (e.g., a microprocessor, etc.), a combination of hardware and software (e.g., a SoC, an ASIC, etc.) and may include one or multiple memories.

Processing module 320 may also control the overall operation or a portion of operation(s) performed by sensor device 100. Processing module 320 may store instructions to collect readings from vibration sensor 310 (e.g., how many samples to collect, the duration of the samples, etc.). Processing module 320 may cause data from vibration sensor 310 to be collected, calculate rotational speed values, and send final values to a user device (e.g., user device 280) when a wireless connection is detected and/or when requested by an application (e.g., client application 285) on user device 280. According to an implementation, processing module 320 may include a clock (e.g., a real-time counter) to generate a time stamp for snapshot data (e.g., RPM values calculated based on readings from vibration sensor 310). According to another implementation, processing module 320 may store a unique identifier that may be used to associate sensor device 100 with rotating machinery 20. According to further implementation, processing module 320 may also be programmed to detect if calculated RPM values exceed a predetermined threshold value and generate an alert signal when the threshold value is exceeded.

Communication module 330 permits sensor device 100 to communicate with other devices, such as user device 280. According to implementations described herein, communication module 330 includes a WPAN interface, such as a BLE interface or NFC interface. For example, communication module 330 may include a transmitter and a receiver, or a transceiver. Communication module 330 may include one or more antennas. Communication module 330 may operate according to a communication standard, such as a Bluetooth® standard, or non-standard short range wireless communications. According to one implementation, communication module 330 and processing module 320 may be included in an integrated SoC configuration.

Communication module 330 may enable sensor device 100 to transfer data, such as calculated rotational speed values from processing module 320, to a user device 280 when user device 280 is within a relatively short distance of sensor device 100 (e.g., up to about 100 feet). Communication module 330 may include various processing logic or circuitry (e.g., multiplexing/de-multiplexing, filtering, amplifying, converting, error correction, etc.). According to one implementation, communication module 330 may detect a pairing signal from user device 280 and, in response, pair with user device 280 and provide a current rotational speed value based on data from vibration sensor 310. According to another implementation, communication module 330 may be activated periodically to report a current reading obtained from vibration sensor 310 data.

Internal power supply 340 may include one or more batteries (e.g., a disposable battery) to power components of sensor device 100. According to an implementation, internal power supply 340 may provide, for example, a five-year battery life for a predicted duty cycle with vibration sensor 310, processing module 320, and communication module 330. In one implementation, internal power supply 340 may include, for example, a lithium thionyl chloride battery configured for low-power service.

Although FIG. 3 shows exemplary components of electronics assembly 110, in other implementations, electronics assembly 110 may contain fewer, different, differently-arranged, or additional components than depicted in FIG. 3. Additionally, or alternatively, a component of sensor device 100 may perform one or more other tasks described as being performed by another component of sensor device 100.

Figure 4A:
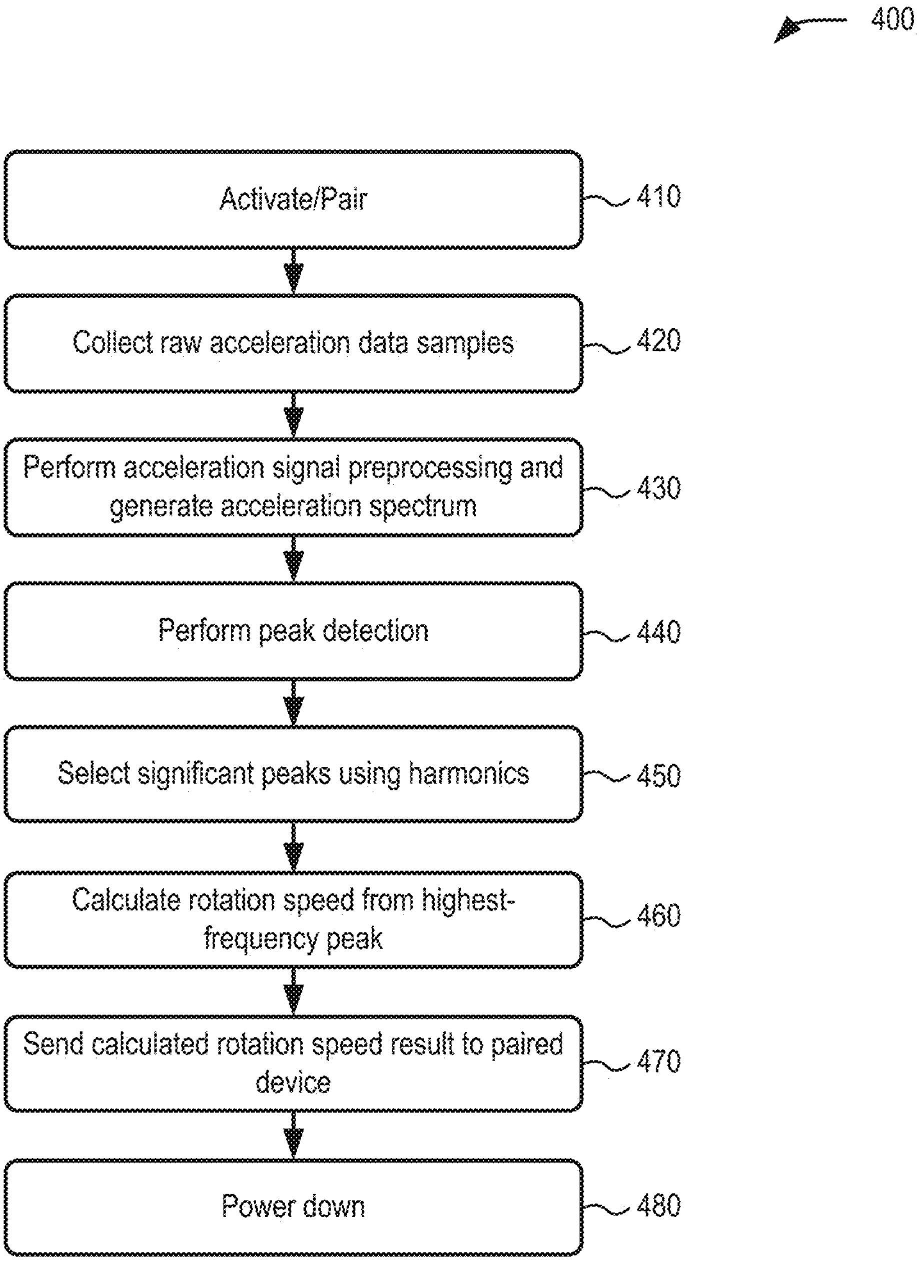
FIGS. 4A and 4B are flow diagrams illustrating a process for providing a vibration-based rotational speed measurement, according to an implementation described herein.
Figure 4B:
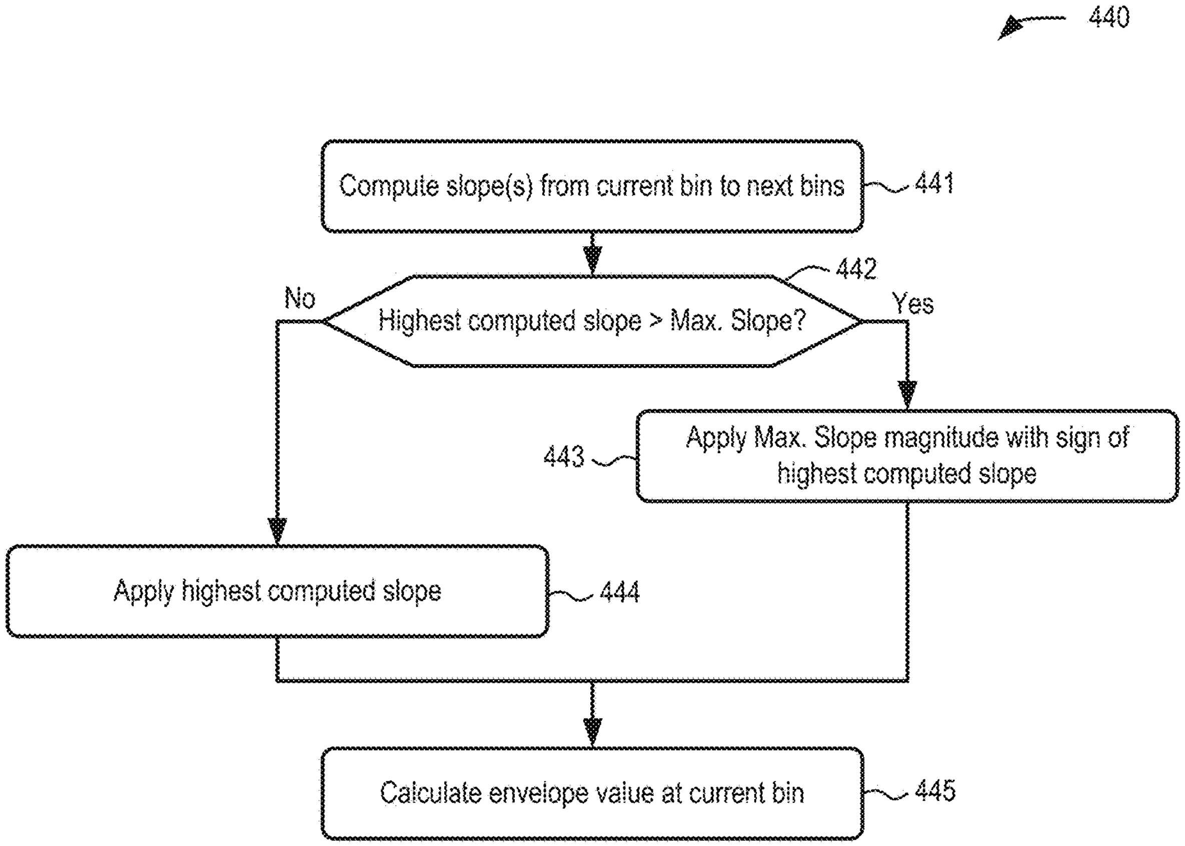

FIGS. 4A and 4B are flow diagrams illustrating a process 400 for providing a vibration-based rotational speed measurement according to an implementation. According to an implementation, process 400 may be performed, for example, by sensor device 100. In other implementations, process 400 may be performed by sensor device 100 in conjunction with other devices, such as user device 280 and/or other sensing devices. Some aspects of process 400 are described below in conjunction with FIGS. 5A-5C, which illustrate a pump acceleration signal, an acceleration spectrum, and a spectrum envelope, respectively, as described further herein.

Process 400 may include sensor device 100 activating and pairing with a user device 280 (block 410). For example, sensor device 100 may maintain a default sleep or deep sleep state with low-power advertising. When in a wireless signal range of sensor device 100, user device 280 may detect that sensor device 100 is available for providing rotational speed (e.g., shaft RPM) readings. Using client application 285, a user of user device 280 may request an RPM reading from sensor device 100, which may cause user device 280 to send a wake-up/request signal to sensor device 100. Sensor device 100 may activate (if necessary), receive the measurement request from user device 280, and initiate a rotational speed measurement.

Figure 5A:
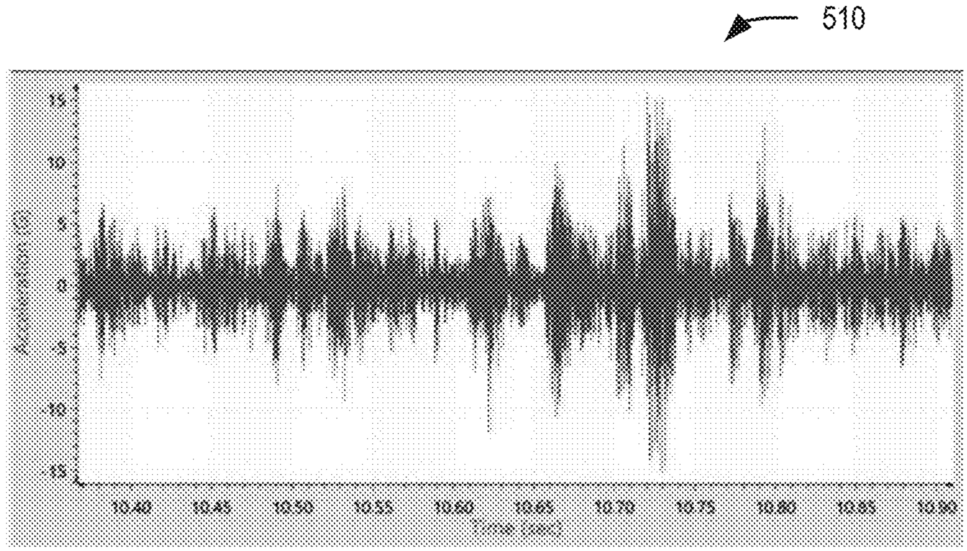
FIGS. 5A-5C are diagrams illustrating a pump acceleration signal, an acceleration spectrum, and a spectrum envelope, respectively.

Process 400 may further include collecting a raw acceleration signal (block 420). For example, upon receiving a request from user device 280, sensor device 100 (e.g., processing module 320) may collect a short sample of vibration data from vibration sensor 310. According to one implementation, the raw data samples may include single-axis acceleration data (e.g., for an axis orthogonal to a pump shaft). For example, vibration sensor 310 may repeatedly measure the acceleration of machinery 20 at a consistent (and very short) interval, to build a collection of data to obtain a picture of how the acceleration of machinery 20 changes with time. Each of the repeated measurements may be referred to as a sample, and a set of evenly spaced samples may be referred to as an acceleration signal. FIG. 5A provides a graph 510 illustrating a pump acceleration signal with sample values over time.

Figure 5B:
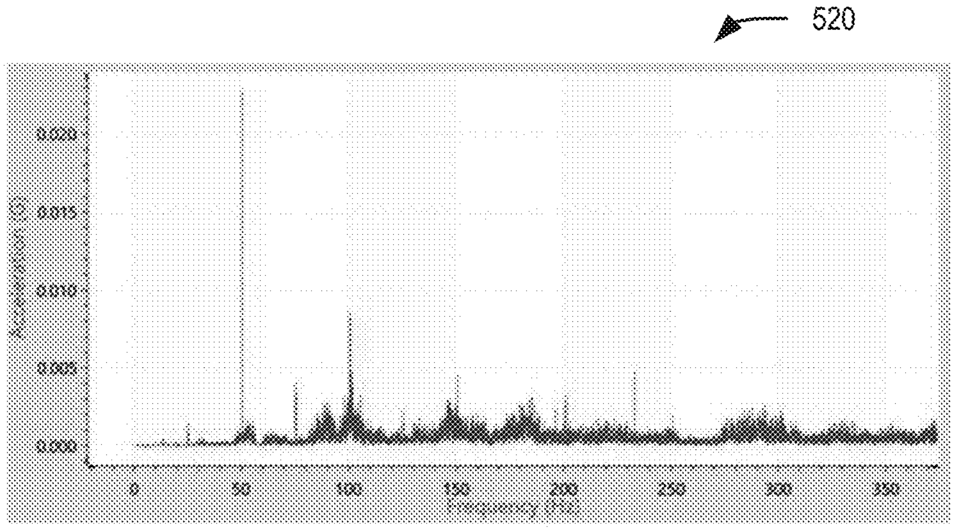

Process 400 may also include performing acceleration signal preprocessing and generating an acceleration spectrum (block 430). For example, for optimal frequency resolution, sensor device 100 (e.g., processing module 320) may down-sample the acceleration signal using a Finite Impulse Response (FIR) decimator, if necessary, to achieve an effective sample rate of, for example, about 1,250 Hz. Processing module 320 may then apply an apodization function (such as a Hann window function) to the down-sampled signal to bring the sampled signal down to zero at the edges of the sampled region. Processing module 320 may compute a discrete Fourier transform (DFT) of the acceleration signal using a Fast Fourier Transform (FFT). The DFT shows information about the frequency content of the signal and may be referred to as an acceleration spectrum. FIG. 5B provides a graph 520 illustrating the spectrum which corresponds to the acceleration signal 510 of FIG. 5A. Instead of samples, the spectrum has frequency bins. A large value in a frequency bin indicates a high amount of vibration near that frequency.

Figure 5C:
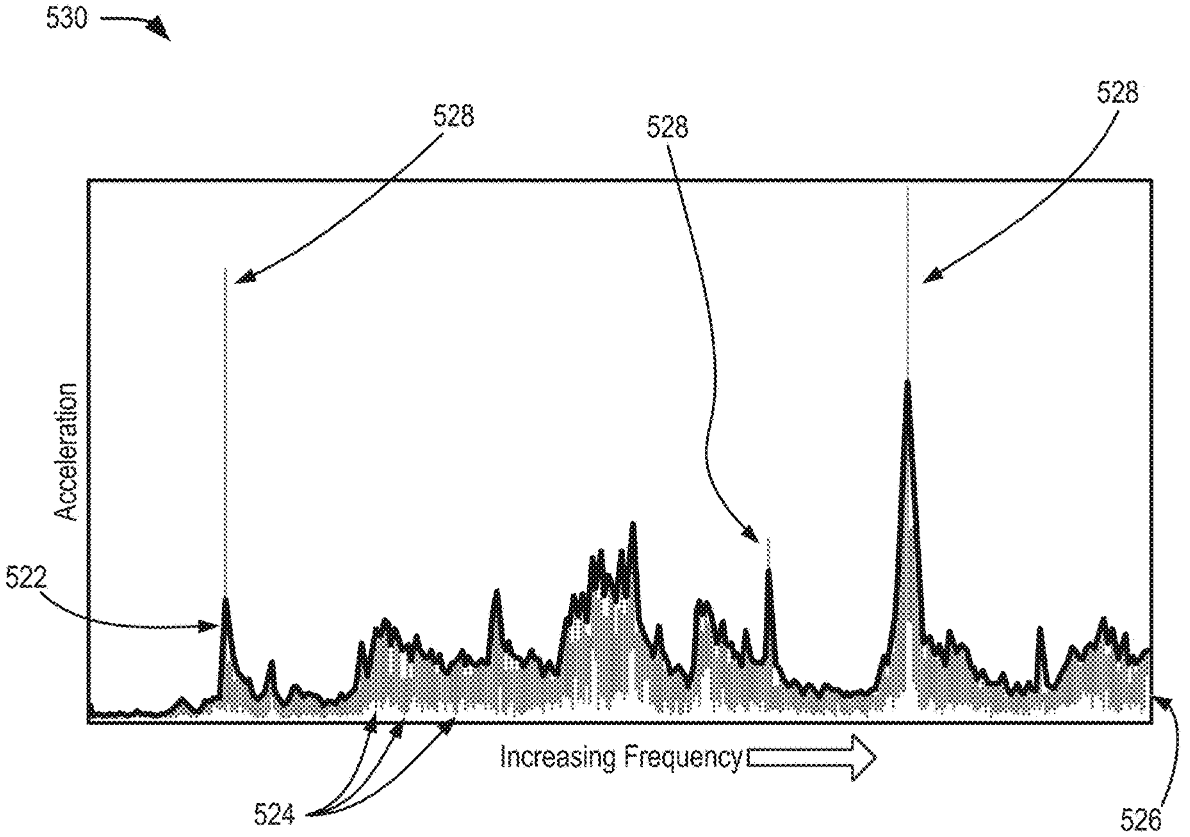

Process 400 may additionally include performing peak detection (block 440). For example, according to an implementation, processing module 320 may perform peak detection using a spectral envelope. Processing module 320 may generate a spectral envelope for the acceleration spectrum identified in process block 430. Details of performing peak detection are described further below in connection with FIG. 4B. FIG. 5C provides a graph 530 illustrating a spectral envelope applied to a spectrum. Referring to FIG. 5C, an envelope 522 may be drawn around the bins 524 forming acceleration spectrum 526. In one implementation, peak bins 528 which stick out above (or exceed a boundary of) envelope 522 may be regarded as significant and the rest of the bins 524 may be discarded as noise.

Process 400 may further include selecting significant peaks (block 450). For example, sensor device 100 (e.g., processing module 320) may select significant peaks from the peak bins 528 identified in process block 440 using harmonics based on known pump characteristics. For example, a pump may typically operate with shaft speed values between 300 RPM and 3600 RPM. Peaks in this frequency range may be considered rotational speed candidates. Pump acceleration spectrums tend to have peaks at integer multiples (or harmonics) of their shaft speed; so the candidate peak having the most integer multiple peaks is selected as the true rotational speed. An exception to this procedure may be made for candidates which are integer multiples of other candidates. Such candidates may be ignored, even if they have many integer multiple peaks.

Process 400 may also include calculating the rotational speed from the highest-frequency peak (block 460). For example, once processing module 320 selects the peak bin with the true rotational speed, processing module 320 may use the highest detected integer multiple peak bin (e.g., the highest-frequency harmonic) to calculate the rotational speed. An integer multiple peak may be used instead of the true rotational speed peak to provide greater precision. According to an implementation, processing module 320 may additionally convert units of the calculated rotational speed from cycles per second (Hz) to revolutions per minute (RPM).

Process 400 may further include sending the calculated rotational speed result to the paired user device (block 470) and powering down (block 480). For example, using WPAN 210, sensor device 100 (e.g., communication module 330) may transmit the determined rotational speed result to user device 280, where the final rotational speed result can be displayed via client application 285. Once the final rotational speed result is transferred to user device 280, sensor device 100 may power down to a sleep mode (e.g., BLE deep sleep).

According to an implementation, process block 440 may include the process described in connection with FIG. 4B. According to an implementation, envelope 522 may be constructed incrementally from the low end of the spectrum 526 to the high end. For each bin 524, the procedure of FIG. 4B may be performed to compute the envelope value.

The current bin and the next several bins (e.g., the next 2, 5, 7, etc., higher-frequency bins) are scanned and the slope required to draw a straight line from the most recently computed envelope value to the value in that bin is computed (block 441). The highest (e.g., most positive) slope computed in process block 441 is selected and compared against a "max slope" value (block 442). The maximum slope can be calculated using acceleration spectrum statistics such as mean or median bin value. If the magnitude of the selected slope (i.e., the highest slope) has larger magnitude than that of the max slope (block 442—Yes), the magnitude of the max slope value is used to determine the envelope value (block 443). Otherwise (block 442—No), the magnitude of the selected slope is used (block 444). In either case regarding process block 442, the sign of the selected slope is preserved. The appropriate slope result is then used (block 445) to determine the value of the envelope as follows:

current envelope value=previous envelope value+slope result.

Figure 6:
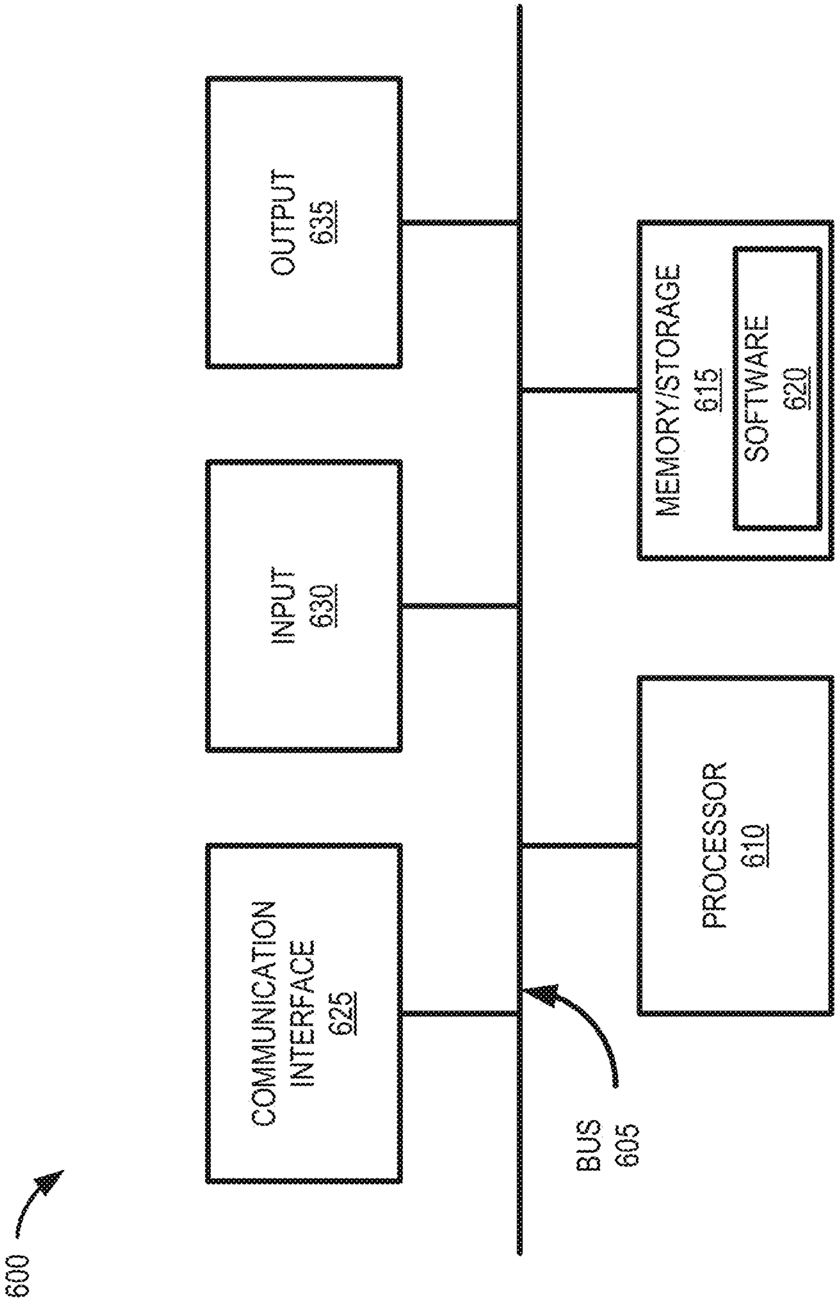
FIG. 6 is a diagram of exemplary components of a device that may be included in the environment of FIG. 2.

FIG. 6 is a diagram illustrating exemplary components of a device 600 that may be included in one or more of the devices described herein. For example, device 600 may correspond to web server 230, database 240, eligibility server 250, application server 260, user device 280, and other types of devices, as described herein. As illustrated in FIG. 6, device 600 includes a bus 605, a processor 610, a memory/storage 615 that stores software 620, a communication interface 625, an input 630, and an output 635. According to other embodiments, device 600 may include fewer components, additional components, different components, and/or a different arrangement of components than those illustrated in FIG. 6 and described herein.

Bus 605 includes a path that permits communication among the components of device 600. For example, bus 605 may include a system bus, an address bus, a data bus, and/or a control bus. Bus 605 may also include bus drivers, bus arbiters, bus interfaces, clocks, and so forth.

Processor 610 includes one or multiple processors, microprocessors, data processors, co-processors, graphics processing units (GPUs), ASICs, controllers, programmable logic devices, chipsets, FPGAs, application specific instruction-set processors (ASIPs), SoCs, CPUs (e.g., one or multiple cores), microcontrollers, neural processing unit (NPUs), and/or some other type of component that interprets and/or executes instructions and/or data. Processor 610 may be implemented as hardware (e.g., a microprocessor, etc.), a combination of hardware and software (e.g., a SoC, an ASIC, etc.), may include one or multiple memories (e.g., cache, etc.), etc.

Processor 610 may control the overall operation or a portion of operation(s) performed by device 600. Processor 610 may perform one or multiple operations based on an operating system and/or various applications or computer programs (e.g., software 620). Processor 610 may access instructions from memory/storage 615, from other components of device 600, and/or from a source external to device 600 (e.g., a network, another device, etc.). Processor 610 may perform an operation and/or a process based on various techniques including, for example, multithreading, parallel processing, pipelining, interleaving, etc.

Memory/storage 615 includes one or multiple memories and/or one or multiple other types of storage mediums. For example, memory/storage 615 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 615 may include a hard disk (e.g., a magnetic disk, an optical disk, a magneto-optic disk, a solid state disk, etc.), a MEMS-based storage medium, and/or a nanotechnology-based storage medium. In some instances, memory/storage 615 may include drives for reading from and writing to the storage medium.

Memory/storage 615 may be external to and/or removable from device 600, such as, for example, a Universal Serial Bus (USB) memory stick, a dongle, a hard disk, mass storage, off-line storage, or some other type of storing medium. Memory/storage 615 may store data, software, and/or instructions related to the operation of device 600.

Software 620 includes an application or a program that provides a function and/or a process. Software 620 may include firmware, middleware, microcode, hardware description language (HDL), and/or other form of instruction. Software 620 may also be virtualized. Software 620 may further include an operating system (OS) (e.g., Windows, Linux, Android, proprietary, etc.).

Communication interface 625 permits device 600 to communicate with other devices, networks, systems, and/or the like. Communication interface 625 includes one or multiple wired and/or wireless interfaces. For example, communication interface 625 may include one or multiple transmitters and receivers, or RF transceivers. Communication interface 625 may operate according to a protocol stack and a communication standard. In some aspects, communication interface 625 may include an antenna. Communication interface 625 may include various processing logic or circuitry (e.g., modulating/demodulating, filtering, amplifying, converting, error correction, application programming interface (API), etc.). Communication interface 625 may be implemented as a point-to-point interface, a service based interface, etc.

Input 630 permits an input into device 600. For example, input 630 may include a keyboard, a mouse, a display, a touchscreen, a touchless screen, a button, a switch, an input port, speech recognition logic, and/or some other type of visual, auditory, tactile, etc., input component. Output 635 permits an output from device 600. For example, output 635 may include a speaker, a display, a touchscreen, a touchless screen, a light, an output port, and/or some other type of visual, auditory, tactile, etc., output component.

Device 600 may perform a process and/or a function, as described herein, in response to processor 610 executing software 620 stored by memory/storage 615. By way of example, instructions may be read into memory/storage 615 from another memory/storage 615 (not shown) or read from another device (not shown) via communication interface 625. The instructions stored by memory/storage 615 cause processor 610 to perform a process and/or a function, as described herein. Alternatively, for example, according to other implementations, device 600 performs a process and/or a function as described herein based on the execution of hardware (processor 610, etc.).

A device, system, and method are provided for providing vibration-based rotational speed measurements for rotating machinery. A sensor device is provided as a one-piece unit that is mechanically mounted to, for example, a pump. The sensor device includes a vibration sensor, a wireless communications interface for exchanging data with a user device, an internal battery, and a processor. The processor receives a measurement request from the user device, retrieves data samples from the vibration sensor, generates an acceleration spectrum based on the data samples, and detects peaks in the acceleration spectrum. The processor then finds the peaks associated with rotational speed vibration and its harmonics, calculate a rotational speed value based on a highest-frequency peak of the shaft frequency peak and its associated harmonic peaks, and sends the rotational speed value to the user device via the wireless communication interface.

According to an implementation, detecting peaks in the acceleration spectrum includes generating a spectral envelope for the acceleration spectrum, and identifying, as the peaks, bins in the acceleration spectrum that exceed a boundary of the envelope. According to another implementation, generating the spectral envelope includes computing a slope from a current bin to each of one or more subsequent higher-frequency bins, comparing a highest computed slope to a pre-identified maximum slope, and calculating an envelope value from the current bin to the next bin based on the lower of the highest computed slope and the pre-identified maximum slope.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment (s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such.

What is claimed is:

1. A method performed by a sensor device affixed to rotating machinery, comprising:

receiving, by a processor in the sensor device, a measurement request, wherein the measurement request is provided from a user device via a wireless communication interface;

receiving, by the processor, data samples from a vibration sensor in the sensor device;
generating, by the processor, an acceleration spectrum based on the data samples;
detecting, by the processor, peaks in the acceleration spectrum, the detecting comprising:
generating a spectral envelope for the acceleration spectrum based on respective acceleration values associated with a plurality of bins in the acceleration spectrum, and
determining, as the detected peaks, peak bins from the plurality of bins that have acceleration values greater than corresponding acceleration values of the spectral envelope;
selecting, by the processor and from the detected peaks, a shaft frequency peak and its associated harmonic peaks based on predetermined characteristics of the rotating machinery;
calculating, by the processor, a rotational speed value based on a highest-frequency peak of the shaft frequency peak and its associated harmonic peaks; and
sending, by the processor, the rotational speed value to the user device via the wireless communication interface.

2. The method of claim 1, wherein generating the spectral envelope comprises:
computing a slope from a first bin to each of one or more subsequent higher-frequency bins,
comparing a highest computed slope to a pre-identified maximum slope, and
calculating an envelope value from the first bin to the next bin based on the lower of the highest computed slope and the pre-identified maximum slope.

3. The method of claim 1, further comprising:
automatically initiating, by the processor, a sleep state for the sensor device after the sending.

4. The method of claim 1, wherein sending the rotational speed value comprises:
sending the rotational speed value to the user device via a wireless personal area network (WPAN).

5. The method of claim 1, wherein sending the rotational speed value further comprises:
transmitting the rotational speed value with a unique identifier for the sensor device.

6. A sensor device for rotating machinery, the sensor device comprising:
an electronics assembly comprising:
a vibration sensor,
a wireless communications interface for exchanging data with a user device,
a battery, and
a processor configured to:
receive data samples from the vibration sensor,
generate an acceleration spectrum based on the data samples,
detect peaks in the acceleration spectrum, the detection comprising:
generating a spectral envelope for the acceleration spectrum based on respective acceleration values associated with a plurality of bins in the acceleration spectrum, and
determining, as the detected peaks, peak bins from the plurality of bins that have acceleration values greater than corresponding acceleration values of the spectral envelope,
select, from the detected peaks, a shaft frequency peak and its associated harmonic peaks based on characteristics of the rotating machinery,
calculate a rotational speed value based on a highest-frequency peak of the shaft frequency peak and its associated harmonic peaks, and
send the rotational speed value to the user device via the wireless communication interface;
an enclosure for the electronics assembly; and
an attachment element to rigidly secure the enclosure to the rotating machinery.

7. The sensor device of claim 6, wherein, when generating the spectral envelope, the processor is further configured to:
compute a slope from a first bin to each of one or more subsequent higher-frequency bins,
compare a highest computed slope to a pre-identified maximum slope, and
calculate an envelope value from the first bin to the next bin based on the lower of the highest computed slope and the pre-identified maximum slope.

8. The sensor device of claim 6, wherein the processor is further configured to:
automatically initiate a sleep state for the sensor device after the sending.

9. The sensor device of claim 6, wherein the sensor device is configured to attach to the rotating machinery as a single element.

10. The sensor device of claim 6, wherein the vibration sensor includes a single-axis Micro-Electromechanical System (MEMS) accelerometer.

11. The sensor device of claim 6, wherein the wireless communications interface includes an interface for a wireless personal area network (WPAN).

12. The sensor device of claim 6, wherein, when sending the rotational speed value, the processor is further configured to:
transmit a unique identifier associated with the rotating machinery.

13. The sensor device of claim 6, wherein the enclosure for the electronics assembly is configured for attachment to a submersible pump.

14. A system for monitoring rotational speed of rotating machinery, the system comprising:
a sensor device including:
an electronics assembly comprising:
a vibration sensor,
a wireless communications interface for exchanging data with a user device,
a battery, and
a first processor configured to:
receive a measurement request from the user device,
receive data samples from the vibration sensor,
generate an acceleration spectrum based on the data samples,
detect peaks in the acceleration spectrum, the detection comprising:
generating a spectral envelope for the acceleration spectrum based on respective acceleration values associated with a plurality of bins in the acceleration spectrum, and
determining, as the detected peaks, peak bins from the plurality of bins that have acceleration values greater than corresponding acceleration values of the spectral envelope,
select, from the detected peaks, a shaft frequency peak and its associated harmonic peaks based on characteristics of the rotating machinery, calculate a rotational speed value based on a highest-frequency peak of the shaft frequency peak and its associated harmonic peaks, and send the rotational speed value to the user device via the wireless communications interface;

an enclosure for the electronics assembly; and an attachment element to rigidly secure the enclosure to the rotating machinery.

15. The system of claim 14, further comprising:

the user device including:

a second wireless communications interface for exchanging data with the sensor device;

a memory to store instructions; and a second processor configured to execute the instructions to:

establish a communication session with the sensor device, send a measurement request to the sensor device, receive, from the sensor device, the rotational speed value, and present, to a user, the rotational speed value.

16. The system of claim 15, further comprising:

a network device configured to:

receive, from the user device, the rotational speed value, and store the rotational speed value for the rotating machinery.

17. The system of claim 16, wherein the sensor device is configured to attach to the rotating machinery as a single element.

* * * * *